UNITED STATES PATENT OFFICE.

THOMAS A. EDISON, OF LLEWELLYN PARK, ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH-RECORD.

1,158,659.          Specification of Letters Patent.        Patented Nov. 2, 1915.

No Drawing.      Application filed March 3, 1909. Serial No. 481,167.

*To all whom it may concern:*

Be it known that I, THOMAS A. EDISON, a citizen of the United States, and a resident of Llewellyn Park, Orange, in the county of Essex and State of New Jersey, have invented certain new and useful Improvements in Phonograph-Records, of which the following is a description.

My invention has for its object the production of an improved composition capable of existing in a molten state and having sufficient fluidity to be molded into a phonograph record preferably by the centrifugal process, and capable of hardening and shrinking when cooled to enable the record to be removed from the mold, said molded record being of great hardness and toughness so as to adapt it to resist wear to a greater extent than any moldable compositions previously known, whereby records having a record groove with four hundred threads to the inch can be successfully made.

The improved composition is formed by the employment of shellac and a solvent therefor or agent for rendering the same sufficiently fluid, solid at ordinary temperatures and melting to a mobile liquid at such low temperature that no decomposition either of itself or the shellac takes place, thus avoiding gas bubbles. The liquid so formed may be poured into a heated tubular mold which is rapidly rotated to form the record. The mold is then cooled, whereupon the record solidifies and eventually contracts so that it may be removed from the mold, or the record may be removed by a collapsing process without chilling.

I have found a number of solvents or agents for rendering the shellac sufficiently fluid to make good molded records, some of these compositions resulting in the formation of amorphous records and others resulting in the formation of crystalline records, as will hereafter be more fully set forth. The best agent which I have found for making amorphous shellac records is diphenylamin (melting point 54° C.). Fifteen parts of this ingredient are melted and seventy parts of shellac added thereto with vigorous stirring until all is dissolved. When the heat is properly regulated, the liquid resembles molasses and is somewhat filled with air bubbles. If, now, two parts of acetanilid are added, the liquid becomes clear and more limpid when it is ready for use.

The second best record composition of this character is formed from stearic acid (melting point 68° C.) and shellac. The very highest grade of very crystalline stearic acid is used, this being melted and shellac added in successive portions until the proper degree of fluidity for pouring and molding is attained. The best results with stearic acid would seem to be secured with about fifteen parts of stearic acid to fifty to sixty parts of shellac with a small quantity of acetanilid to make the molten mixture more limpid. The proportions here given will vary with the quality of the shellac used, as there are many different brands and variations of the shellac. Such a composition, when molded into a record, is nearly the same as shellac as to hardness, but is tougher and resists wear better. Quite good results can be obtained with other proportions, as the proportion of about fifteen parts of stearic acid to thirty parts of shellac, and to this, say one part of acetanilid may be advantageously added to render the mixture more limpid. The compound obtained by dissolving the shellac in diphenylamin is harder than the compositions formed of shellac and stearic acid in the different proportions, and is, as I have stated, the composition that I consider the best for making the noncrystalline species of my invention.

When the proportion of shellac in the shellac and stearic acid composition is decreased, as for instance, fifteen parts of stearic acid to twenty-six parts of shellac, the molten material is still amorphous, but it is not so hard as shellac or as the different compositions just described, and it is not so desirable as the latter. As the proportion of shellac is still further reduced, as for example, fifteen parts of stearic acid to twenty-two to twenty-four parts of shellac, a composition is formed wherein the stearic acid crystallizes out after it solidifies, provided the liquid composition is kept at the lowest possible temperature and the operation is continued for not too long a time. This composition is also a highly desirable one and very well adapted for the molding of phonograph records. It must be used as soon as made, as it loses its properties of crystallization and hardness if kept long in a molten condition. This composition is specifically claimed in another application, Serial No. 481,168, filed on even date herewith, this application claiming the invention generically and also claiming the amorphous species of the invention.

As has been shown, by varying the relative proportions of the agent for rendering the shellac more fluid and the shellac, I obtain two distinct materials or compositions which vary widely in their character, both of which, however, are remarkably well adapted for the manufacture of phonograph records by a molding process such as I have referred to.

Another desirable solvent which I have found for the shellac in this connection is solid naphthalene (melting point 80° C.). This is melted and the shellac is stirred into the liquid. The naphthalene seems to be equivalent to the stearic acid when used for mixture with the shellac, and the treatment is the same in the case of naphthalene as when the stearic acid is used. The same proportions of naphthalene may be used as in the case of stearic acid and shellac. The hardness of the composition will increase as the shellac increases, but a point is eventually reached, if the shellac content is progressively increased, when the liquid is too thick to be used practically. I prefer to use stearic acid to the solid naphthalene on account of the somewhat objectionable odor of the latter.

The crystalline record described may be formed by the mixture with the shellac of stearic acid or solid naphthalene or equivalents in proper proportion. When such a record is formed, it gradually changes color from a dark to a light yellow and the hardness and toughness increase. This is apparently because of a gradual change of the stearic acid or naphthalene from the amorphous state to the crystalline. There is a segregation of the stearic acid or naphthalene, the product after this change being tough and nearly as hard as celluloid, being even harder than the non-crystalline records, whose production has been described above.

When fifteen parts of stearic acid or equivalent and only twenty-two to twenty-four parts of shellac are used, the shellac being dissolved in the melted stearic acid and the temperature kept very low, not above 240 degrees F., there is no solvent action as is the case in the formation of the amorphous records, but an emulsion is formed of the shellac and the molten stearic acid. Before pouring the record, the liquid is stirred. On cooling, the stearic acid crystallizes out and leaves the shellac as a net work. If, however, the temperature is raised too high, or the mixture is cooked for too long a time, there is a gradual solution of the shellac in the molten material and the stearic acid loses the property of crystallizing out of the mixture. In the crystalline record formed as above described, much less shellac is used than in the amorphous record, and it is, therefore, very much cheaper.

There are other substances which can be substituted for the diphenylamin, stearic acid or naphthalene for rendering the shellac fluid and capable of being molded into desirable phonograph records which materials are equivalent to stearic acid and naphthalene, but they are more expensive and therefore not so practical in commercial work. Among these substances are acetanilid and benzoic acid.

If melted camphor is used as a solvent for the shellac, there is no such change by crystallization or segregation as occurs when the stearic acid or naphthalene is used with the shellac in an emulsion, and the material formed is very easily deformable by heat.

Instead of molding the record as described above, paper may be coated with the composition, and the record thus formed. For example, paper may be passed through the liquid and wound tightly into a cylinder of the proper size. This is then cooled, and over it is coated a thicker layer of the material as by dipping the cylinder therein. Finally, the paper cylinder is placed in a mold and subjected to heat and hydraulic pressure, whereby the record is impressed on the outer surface. After cooling, the cylinder is removed from the matrix.

Having now described my invention, what I claim and desire to secure by Letters Patent is as follows:

1. A phonograph record comprising shellac and diphenylamin, substantially as described.

2. A phonograph record comprising shellac and diphenylamin and an agent for making the composition clearer, substantially as described.

3. A phonograph record comprising shellac and diphenylamin in the proportion of approximately fifteen parts of diphenylamin to approximately seventy parts of shellac, substantially as described.

4. A phonograph record comprising shellac, diphenylamin and acetanilid in the proportion of approximately fifteen parts of diphenylamin, seventy parts of shellac and two parts of acetanilid, substantially as described.

5. A phonograph record comprising shellac and a solvent therefor which is crystalline at ordinary temperatures and constitutes more than fifty per cent. by weight of the record composition, substantially as described.

6. As an article of manufacture, a phonograph record comprising a mixture of approximately 70 parts of shellac and 15 parts of a solvent for shellac which is solid and crystalline at ordinary temperatures, and a clearing agent in sufficient amount to clear the mixture, substantially as described.

7. As an article of manufacture, a phonograph record comprising approximately 70 parts of shellac, 15 parts of a solvent for shellac which is solid and crystalline at ordinary temperatures and which melts at such a low temperature that no decomposition of the shellac takes place, and a clearing agent in sufficient amount to clear the mixture, substantially as described.

8. A phonograph record comprising shellac and a solvent therefor which is crystalline at ordinary temperatures and melts at a temperature at which substantially no decomposition of the shellac takes place, the shellac being present in excess of said solvent and constituting more than 50% by weight of the record composition, substantially as described.

This specification signed and witnessed this 2nd day of March 1909.

THOS. A. EDISON.

Witnesses:
FRANK L. DYER,
DYER SMITH.